United States Patent
Potthoff

[15] 3,658,169
[45] Apr. 25, 1972

[54] SCRAPER TO RECOVER BULK MATERIAL FROM STORAGE

[72] Inventor: Ingo Potthoff, Dortmund-Schuren, Germany

[73] Assignee: Gustav-Schade Maschinenfabrik, Dortmund, Germany

[22] Filed: June 1, 1970

[21] Appl. No.: 42,288

[52] U.S. Cl. ................................. 198/36, 214/10
[51] Int. Cl. ................................................. B65g 65/28
[58] Field of Search ................ 214/10, 44 A; 198/8, 36, 91, 198/102, 170; 37/191, 191 A, 192, 192 A

[56] References Cited

UNITED STATES PATENTS

| 791,653 | 6/1905 | Rouze | 198/36 X |
|---|---|---|---|
| 1,346,681 | 7/1920 | Pratt | 214/44 A |

FOREIGN PATENTS OR APPLICATIONS

| 1,142,572 | 4/1957 | France | 198/8 |
|---|---|---|---|
| 680,544 | 8/1939 | Germany | 214/10 |
| 1,284,899 | 12/1968 | Germany | 214/10 |
| 648,720 | 11/1962 | Italy | 214/10 |

Primary Examiner—Gerald M. Forlenza
Assistant Examiner—Frank E. Werner
Attorney—Meyer, Tilberry & Body

[57] ABSTRACT

A gantry frame resembling an inverted V is movable on tracks so as to straddle a heap of dry bulk material. Two jib cranes are articulated together, the articulation being at the vertex of the inverted V which the two jib cranes form together when the storage area is heaped full. One jib crane is pivoted at its outer end at the lower end of one leg of the gantry frame. The lower, free end of the other jib crane runs in a track or guideways mounted near the lower end of the other leg of the gantry frame. Each jib carries a flight-type of endless belt undershot conveyor, one jib conveyor having two rotary members (sprockets or idlers) at the inner or vertex end, and a plane through the axes of rotation forms an obtuse angle with the work run of the conveyor, such that the outer jib endless conveyor at its inner or delivery end at all times overlies the receiving end of the pivoted jib conveyor. The two conveyors form an angle that varies between approximately the vertex angle of the V (storage area full) and approximately 180° (storage area empty). A second embodiment is carried on a frame that pivots on a vertical axis on a self-propelled tracklayer, wherein again the outer conveyor at its inner (delivery) end overlies the receiving end of the conveyor pivoted to the frame. Whereas the first embodiment is intended to straddle a heap, the second embodiment is intended to operate alongside the heap so that the outer conveyor extends upward alongside the heap so that the outer conveyor extends upward along the slope of heaped material, with the result that the two jibs and the conveyors carried by them form an angle between them that is greater than 180° in the position on a heap of storage material that is referred to above.

14 Claims, 2 Drawing Figures

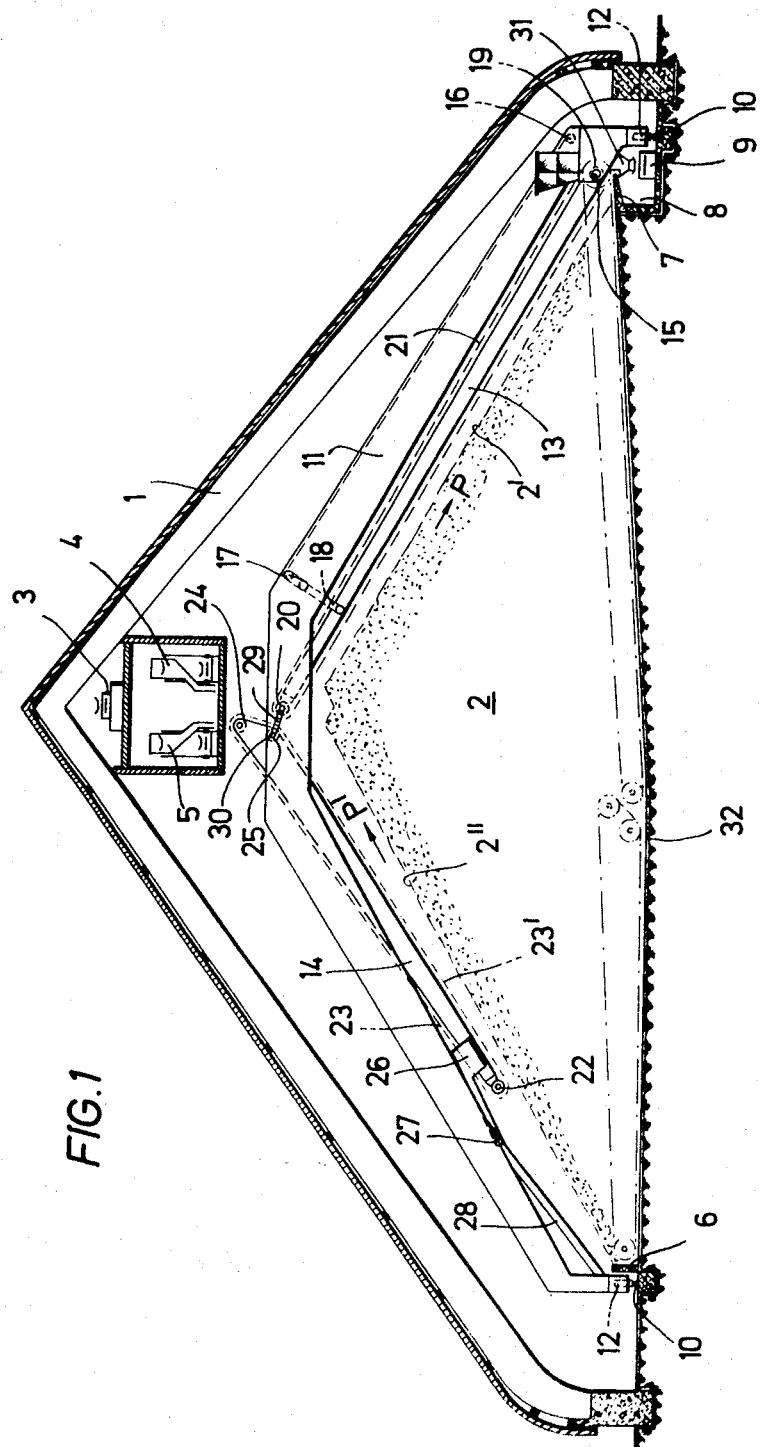

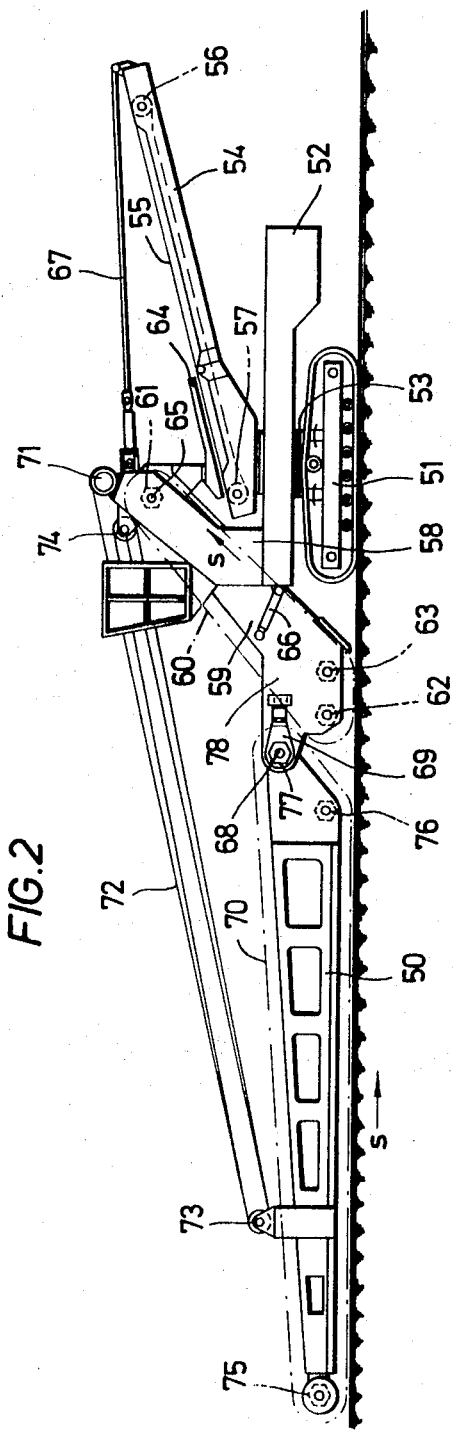

SCRAPER TO RECOVER BULK MATERIAL FROM STORAGE

BACKGROUND OF THE INVENTION

1. Field of the Invention

The invention relates to a scraper for recovering bulk material from storage, and in particular to a scraper which includes two pairs of continuous tension members carrying scraper flights, the scraper flights dragging along the surface of the stored bulk material, each pair of tension members being mounted on a jib which is adapted to be raised and lowered by means of suitable lifting mechanism.

2. The Prior Art

Generally, prior art scrapers for removing material from storage have only a single rigid scraper jib. It has already been proposed to subdivide the scraper jib in articulated fashion, in the longitudinal direction or to so connect together, one behind the other and in articulated fashion, two scraper jibs each which has its own drive so that the scraper jib which is at the front, looking toward the conveying direction, operates on one side of a slope or on an upper side of a storage heap or dump and the rear scraper jib is on the other slope side of the heap. The two scraper jibs, connected one behind the other, are vertically and angularly adjustable by means of cable tackle, so that the heap of bulk material may thus be engaged over the full height and width, and removed.

In one prior art scraper of this type, one jib element of an articulated jib is retained at its head end in a track on a gantry framework. In the extended or stretched position of the two articulated jibs, the jibs are arranged one behind the other in alignment. Consequently, chain star wheels or the chain drums of the jibs are disposed, in the zone of the articulation point, with more or less considerable spacing between them during the transfer of the conveyed material from the first jib to the next, difficulties may arise. This danger is in particular present if a strongly caking or hardened conveyed material, such as for example fertilizer salts and the like, is to be removed from storage.

It is especially disadvantageous when, in articulated connections of prior art scrapers, the jibs are lowered to substantially the bottom of the heap or into the extended position, in which their longitudinal axes are located on a common substantially horizontal line at substantially the same level as the end idlers or sprockets. In this case, there may be formed, between the idlers or sprockets of the jibs at the place of articulation, bulk material wedges which are not engaged by circulating scraper flights of the jibs and which interfere with proper transfer of the bulk material from the one jib to the other. There is then a danger that the scraper flights of the one jib may entrain the bulk material at the end idler or sprocket into the upper or return run of the endless conveyor and convey it back once again in the upper run. That jib conveyor then operates in an unintentional "short circuit," without being able to feed the bulk material removed by it to the next jib conveyor.

Among other prior art scrapers for removing material from storage, there are also those which are equipped with a steeply sloping conveyor, for example an intermediate bucket elevator or a trough-type chain conveyor, which receives the heaped material removed from the heap slope by the jib scraper and feeds it to a sequentially connected conveying means, for example an ejector belt arranged on a jib. In this case also, difficulties may be encountered on transfer of the heaped material from the jib scraper onto the steeply sloping conveyor.

SUMMARY OF THE INVENTION

According to the basic concept of this invention, the transfer arrangement between jibs at the articulation point is that of a stepped transfer means wherein the outer jib is arranged at its transfer or delivery end to overlie the receiving end of the jib conveyor which is pivoted to the frame.

The step transfer is achieved by an arrangement whereby the outer jib conveyor has at its delivery end idler or sprocket wheels having their axes arranged at two levels relative to the work run of the outer jib conveyor. Accordingly, the idler or sprocket wheels at said transfer or delivery end are arranged, when the outer jib is in the horizontal plane, obliquely one above the other.

In such articulated jibs, where two jibs are connected, the outer jib, i.e., first to receive a given quantity of material, has the idler or sprocket wheels arranged one above the other as aforesaid at the end adjacent the articulation point. The sequentially connected (pivoted to the gantry frame) jib is pivotally connected, in a conventional manner, at its end opposite the articulation point and near the foot of the heap, with the traveling frame of the scraper for the removal of material from the storage heap, so that it may be lifted and lowered in a vertical plane by means of a lifting winch. This pivoted, or sequentially connected, jib has conventionally at each jib end only one pair of idler or sprocket wheels for the two parallel endless tension members (chain, cable, or the like). The two scraper jibs may be so coupled through the agency of articulation arms or the like that the outer jib is disposed, over the entire jib slewing zone, with its upper sprocket wheels at a level above the adjacent end of the sequentially connected scraper jib. The articulation arms are preferably rigidly secured to the sequentially connected scraper jib, whereas, at the transfer end of the scraper jib which is connected in front they engage at a point located below the axis of the upper sprocket wheels, the articulation axis of the articulation arms expediently coinciding with the axis of the lower sprocket wheels of the transfer end of the scraper jib which is connected in front.

Preferably, in the case of the articulated jib embodiment, to arrange that, in the extended or stretched position of the two scraper jibs, the upper sprocket wheels arranged at the transfer end of the scraper jib which is connected in front should engage laterally over the sprocket wheels at the adjacent end of the sequentially connected scraper jib, whereas the axes of the lower sprocket wheels are, at the said transfer end, substantially in a common horizontal plane with the axes of the associated sprocket wheels of the sequentially connected scraper jib.

With the above-discussed embodiment of the articulated jib, proper transfer of the bulk material removed from the surface of the heap from one scraper jib to the other scraper jib is guaranteed and, simultaneously, it is made possible to completely remove the heap down to the floor of the storage place, without a residual layer remaining on the said floor.

The same may be achieved with a form of embodiment of the scraper for the removal of material from storage wherein the scraper jib designed in the manner according to the invention is, at its transfer end, instead of being connected with a second scraper jib, connected in articulated fashion with the foot of a sequentially connected steep-angle conveyor, for example a trough chain conveyor or a bucket elevator. The articulation means between the scraper jib connected in front and the sequentially connected steep-angle conveyor is, with this arrangement, located preferably at a level above the lower sprocket wheels of the transfer end of the scraper jib, the articulation axis expediently coinciding with the pivot axis of the upper sprocket wheels of the transfer end of the scraper jib. In a manner which is constructionally advantageous, the endless chains of the steep-angle conveyor are guided, in the lower zone, over sprocket wheels disposed one behind the other in the longitudinal direction of the jib, the axes of the said sprocket wheels, when the scraper jib is lowered into the horizontal position, being located substantially in a common horizontal plane with the axis of the lower sprocket wheels of the jib transfer end, whereas the upper sprocket wheels of the jib transfer end are disposed obliquely above the lower sprocket wheels of the steep-angle conveyor.

In any case, according to this invention, the front scraper means and the rear conveyor means (which may be a second scraper jib or a steep conveyor) are arranged and coupled at their articulation point in such a manner, that the front scraper jib is, with its transfer end located at the articulation point, in every operational position (i.e. also in the zone of the extended position of the two scraper jibs) constrainedly retained sufficiently far above the adjacent reversal and feed end of the rear conveyor means to ensure that the said wedge formation is avoided and scraper rakes, during their circulation about the reversal end of the front scraper jib, discharge the bulk material which they entrain, unhindered, over a step forming at the surface of the heap at the articulation point, into the conveying zone of the rear conveyor means, so that it can be entrained thereby.

It is among the objects of the invention to obviate or reduce the disadvantages mentioned in respect of prior art scrapers for removing material from storage, in particular such scrapers equipped with an articulated jib.

It is another object of the invention to provide an articulated scraper for the recovering of bulk material from storage which avoids the accumulation of such material at the point of articulation.

It is a further object of the invention to provide such an articulated scraper that enables removal of the bulk material down to the storage floor with a minimum of residual material; other objects will become apparent to those skilled in the art from the following detailed description and from a consideration of the accompanying drawings, wherein:

FIG. 1 shows, diagrammatically and as a lateral elevation, a first embodiment of the scraper for the removal of material from storage according to the invention, having an articulated jib; and FIG. 2 shows, diagrammatically and as a lateral elevation, a second embodiment of a scraper for the removal of material from storage according to the invention equipped, in this case, with a one-part scraper jib and a steep-angle conveyor.

In FIG. 1, reference numeral 1 designates the roof construction of a storage shed spanning a bulk material heap 2. Arranged at the apex of the roof construction is a belt 3 for the introduction of material to be stored. The belt 3 has two distributor belts 4 and 5 which are arranged to travel in the longitudinal direction of the heap and with the aid of which the bulk material to be stored is fed in and discharged onto the heap. This device for the introduction of storage material is of subsidiary importance to the invention and therefore need not be discussed in detail.

The storage site is bound on one side by a wall 6, and on the other side by a wall provided with a ramp 7 extending over a belt channel 8. Arranged in the belt channel 8 is a stationary storage site belt 9 extending in the longitudinal direction of the heap.

Laterally adjacent the storage site walls 6 and 7 are arranged rails 10 on which a gantry 11 spanning the heap 2 is displaceable by means of travel wheels 12. The gantry 11 is adapted to travel along the heap 2 and has an articulated jib consisting of the two scraper jibs 13 and 14 which are articulated to each other. The scraper jib 13 is mounted for pivoting about a horizontal articulation axis 15 on the gantry 11, in the vicinity of the base of the heap above the storage site belt 9. The lifting and lowering of the scraper jib is effected in a conventional manner by means of a winch 16 arranged on the gantry 11 and the winch cable of which is guided over pulleys 17 and engages, via a swivel arm 18 near the front end of the scraper jib 13, on the latter. As will be understood by those skilled in the art, the scraper jib 13 consists of a box beam of welded construction having at both its ends chain drums or sprocket wheels 19 and 20 over which two endless, parallel sprocket chains 21 are driven and deflected, these chains are connected in the conventional manner and in spaced relationship via scraper flights (not shown). The axes of the sprocket wheels 19 and 20 are in a common plane which coincides with the longitudinal central plane of the scraper jib 13. The axis of rotation of the two driven sprocket wheels 19 coincides with the pivot axis 15 of the scraper jib 13.

The scraper jib 14 connected ahead of the scraper jib 13 also consists of a box beam or load bearing member of welded construction, having at its free head end a sprocket drum or two sprocket wheels 22 disposed on a common shaft and provided for the two parallel, endless chains 23 connected through the agency of scraper flights. At the other end, the front scraper jib 14 has two sprocket drums or two pairs of sprocket wheels 24 and 25. The common axis of the sprocket wheels of the lower pair of sprocket wheels 25 is located substantially in a common plane with the axis of the sprocket wheels 22, and said plane extending substantially parallel to that plane in which the scraper chains 23 travel in the working or lower run 23'. The sprocket wheels of the further pair of sprocket wheels 24 are arranged obliquely above the sprocket wheels 25. In this case, the arrangement is such that in the slewing position shown in FIG. 1, where the scraper jibs are completely raised by means of the lifting winch, the sprocket wheels 24 and 25 are disposed substantially vertically one above the other at the transfer or delivery end of the scraper jib 14 which is connected in front, whereas, in the fully lowered position of the scraper jibs shown in dot-dash lines in FIG. 1, they extend obliquely one above the other at an angle of approximately 40° to 60° relative to the horizontal, so that the sprocket wheels 24 are disposed laterally above the sprocket wheels 20 of the rear scraper jib 13, whereas the sprocket wheels 25 are disposed with a small degree of spacing laterally adjacent the sprocket wheels 20. Thus, the scraper chains of the scraper jib 14 extend, in the lower and upper runs, inclined at an acute angle to each other, and the lower run of the scraper chains extend from the lower sprocket wheels 25 obliquely upwardly to the sprocket wheels 24 positioned at a higher level.

The scraper jib 14 connected in front has, near its free end, lateral guide arms 26 having guide pulleys or rollers 27 which are so guided in guideways 28 on the gantry frame that the scraper jib 14 may be displaced, together with the scraper jib 13 and by means of the winch 16, from the raised position shown in full lines into the completely lowered position indicated in dot-dash lines.

Rigidly secured at the end of the box beam of the scraper jib 13 facing the scraper jib 14, in the lateral position, are arms 29 which extend in the direction of the longitudinal axis of this scraper jib and are articulated at their free ends, at 30, to the adjacent end of the scraper jib 14, so that the two scraper jibs are pivotal relatively to each other in the common vertical plane. The pivot axis 30 coincides with the pivot axis of the lower sprocket wheels 25. It will be apparent that, due to this articulated connection, the scraper jib 14 which is connected in front is so retained, with its transfer end, over the entire pivoting zone or range of the scraper jib that the upper sprocket wheels 24 are always disposed laterally above the sprocket wheels 20 of the sequentially connected scraper jib 13.

In operation, the two scraper jibs 13 and 14 are lowered by means of the winch 16, whereby the sequentially connected scraper jib 13 is applied on the slope 2' of the heap, whereas the scraper jib 14 connected in front is first of all lifted off the opposite slope 2" of the heap. During the removal from storage operation, the removal from storage scraper travels along the heap on the rails 10. Meanwhile, the scraper flights arranged on the endless chains 21 of the scraper jib 13 penetrate into the heap 2' by the amount of the cutting depth and in so doing, they scrape the bulk material, in the direction of arrow P, down the slope and, at the foot of the heap, over the ramp 7, so that it is discharged via a hopper 31 onto the storage site belt 9. After every extraction travel, the two scraper jibs 13 and 14 are lowered by the amount of the cutting depth, the above-described procedure being thereafter repeated. In this way, after a plurality of extraction travels in longitudinal direction of the heap 2 the scraper jib 14 which is connected in front passes into the working position at the slope 2" so that the scraper flights convey the bulk material, on the lower run of the scraper chains and at the slope 2", in the direction of arrow P', upwards in the direction towards the articulated connection 29, 30, where the material is engaged by the circulating scraper flights of the scraper jib 13 and entrained in the direction of arrow P. Since, at the transfer end of the scraper jib 14, two sprocket wheel pairs 24 and 25 are arranged obliquely one above the other and therewith the upper pair of sprocket wheels 24 is disposed, in each slewing position of the two scraper jibs, above the sprocket wheels 20 of the other scraper jib, even in the case of hardened bulk material tending to be sticky, proper transfer of the bulk material from the scraper jib 14 onto the scraper jib 13 is assured.

As already stated, the two scraper jibs 13 and 14 are lowered stepwise, by means of the common winch 16, by the amount, in each case, of the cutting depth of the scrapers. In the fully lowered position shown in dot-dash lines, the two scraper jibs 13 and 14 bear directly on the storage site floor 32 which extends horizontally in the pivoting zone of the scraper jib 14 connected in front whereas, in the pivoting zone of the sequentially connected scraper jib 13, it extends so as to sightly ascend towards the ramp 7. As may be seen, with the above-described design of the transfer end of the scraper jib 14 and also the articulated connection of the two scraper jibs, it is possible to completely remove the heap without a layer of bulk material remaining on the floor of the storage site or without it being necessary to give step-like shape to the storage site floor 32 itself.

FIG. 2 shows a variant of a scraper for the removal of material from storage where instead of an articulated jib there is a one-piece scraper jib 50. The scraper for the removal of storage material is, in this embodiment, provided with a track-laying travel mechanism 51 carrying a rotating frame 52, the toothed annulus thereof being designated 53. Concentrically on the rotating frame, over the track-laying travel mechanism, a jib 54 is mounted for pivoting about a vertical pivot axis coinciding with the pivot axis of the toothed annulus 53. The jib 54 has a conveyor belt 55, the drive and reversing drums of which are designated 56 and 57.

Arranged parallel to each other on the rotating frame 52, in the front zone, are two upwardly projecting walls 58 between which is disposed a steep-angle conveyor 59 designed in the manner of a trough chain conveyor. The endless chains 60 of the steep conveyor travel over sprocket wheels 61, 62 and 63. With this arrangement, the steep conveyor is so designed and arranged to be inclined so that the upper sprocket wheels 61 are located above a feed hopper 64 disposed at the feed side of the belt 55. The entire steep conveyor is pivotal about a horizontal axis 65 coinciding with the pivot axis of the upper sprocket wheels 61. For pivoting, there are employed pressure medium actuated cylinders 66 supported forwardly at the frame 52 and the piston rods of which engage laterally on the steep conveyor. The jib 54 is suspended from the upper portion of the walls 58 by means of a tension member 67 the length of which is adjustable.

The lower sprocket wheels 62 and 63 of the two parallel endless chains 60 of the steep conveyor are disposed, with their pivot axes, laterally juxtaposed in a common horizontal plane. The chains 60 rotating in the direction of arrow S and carrying the scraper flights arranged thereon are therefore so deflected in the return travel run at the sprocket wheels 62 that they travel, on the path as far as the sprocket wheels 63, substantially horizontally over the storage site floor. At the sprocket wheels 63, the chains 60, being bridged at short intervals by the scraper flights, are then deflected into the obliquely upwardly ascending travel path.

Secured to the frame of the steep conveyor, in the lower zone, are parallel bearing plates 78, on which the scraper jib 50 is pivotally mounted, the horizontal pivot axis being shown at 68. Mounted on one of the two bearing plates 78 is the drive 69 for the scraper chains 70 of the scraper jib.

The raising and lowering of the scraper jib 50 is effected in a conventional manner by means of a winch 71 arranged on the upper ends of the walls 58, and the winch cable 72 which is reeved over pulleys 73 and 74, of which pulleys 73 are arranged near the front of the jib 50.

The two endless chains 70 of the scraper jib 50 are deflected and driven via drive and deflecting sprocket wheels 75, 76 and 77. Thus, at the transfer end of the scraper jib there are two pairs of sprocket wheels 76 and 77, whereas there is only the sprocket wheel 75 at the free head end of the jib. The sprocket wheels 77 driven by way of the drive 69 are disposed laterally above the sprocket wheels 76 and their pivot axis coincides with the pivot axis 68 of the jib 50. The arrangement of the sprocket wheels 76 and 77 corresponds substantially to the arrangement of the sprocket wheels 24 and 25 described in detail with reference to the embodiment according to FIG. 1. The lower sprocket wheels 76 are disposed, when the scraper jib 50 is lowered, laterally adjacent the sprocket wheels 62 of the steep conveyor, whereas the upper sprocket wheels 77 are arranged with a small degree of lateral spacing above the sprocket wheels 62. Apart from this, in the lowered horizontal position of the scraper jib 50, the axes of the sprocket wheels 62, 63, 75 and 76 are located in a common horizontal plane. The scraper jib 50 is upwardly pivotal from the lowered horizontal position, for example through an angle of 70°. In this raised pivoting position, the sprocket wheels 76 are disposed substantially at the same level as the sprocket wheels 77.

The above-described design of the transfer end of the scraper jib 50 provides proper transfer of the bulk material removed by the scraper jib 50 at the heap slope on to the steep conveyor. The bulk material is conveyed within a trough obliquely upwardly by the running steep conveyor chains and the scraper flights arranged thereon and is fed via the hopper 64 to the belt 55 which throws down the bulk material at the free head end of the jib. It will readily be appreciated from FIG. 2 that the bulk material lying on the heap may be removed, using the scraper jib 50, down to the floor of the storage site, without any bulk material residual layer remaining on the floor.

What I claim is:

1. Scraper apparatus for removing material from the surface of a storage pile comprising; scraper jib means movably mounted for raising and lowering movement, said scraper jib means having first and second opposite end portions, said second end portion defining a transfer end portion, sprocket means on said end portions of said scraper jib means, continuous scraper means having a lower working run and an upper return run and being movably trained around said sprocket means for movement of said lower run toward said transfer end portion and said upper run away from said transfer end portion, conveying means for receiving material from said scraper jib means, said conveying means having an end portion positioned adjacent said transfer end potion of said scraper jib means, said transfer end portion of said scraper jib means being pivotally connected with said end portion of said conveying means for raising and lowering pivotal movement relative thereto, said sprocket means on said transfer end portion including a pair of sprocket members having spaced-apart axes, said scraper jib means being movable to a substantially horizontal position, said axes of said pair of sprocket members being positioned obliquely one above the other when said scraper jib means is substantially in said substantially horizontal position.

2. The device of claim 1 wherein said pair of sprocket members on said transfer end portion of said scraper jib means define upper and lower sprocket members, said upper sprocket member being positioned obliquely above said lower sprocket member in a direction spaced toward said conveying means when said scraper jib means is substantially in said substantially horizontal position.

3. The device of claim 2 wherein said lower working run and said upper return run of said scraper means diverge at an acute angle from said first end portion of said scraper jib means toward said transfer end portion, said lower working run being in a substantially horizontal position when said scraper jib means is substantially in said substantially horizontal position.

4. The device of claim 1 wherein said conveying means comprises a second scraper jib, said scraper jib means and said second scraper jib together defining an articulated boom, said transfer end portion of said scraper jib means being pivotally connected with a first end portion of said second scraper jib, a traveling support frame for said articulated boom, said second scraper jib having a second end portion pivotally connected with said frame.

5. The device of claim 4 wherein said pair of sprocket members on said transfer end portion of said scraper jib means define upper and lower sprocket members, said articulated boom being raisable and lowerable over a predetermined range relative to said frame, said transfer end portion of said scraper jib means being pivotally connected with said first end portion of said second scraper jib for maintaining said upper sprocket member above said first end portion of said second scraper jib throughout said predetermined range of movement of said boom.

6. The device of claim 5 and further including a sprocket member on said first end portion of said second scraper jib, said lower sprocket member on said transfer end portion of said scraper jib means and said sprocket member on said first end portion of said second scraper jib having axes lying substantially in a common horizontal plane when said scraper jib means is substantially in said substantially horizontal position.

7. The device of claim 5 and further including arm means rigidly secured to said first end portion of said second scraper jib, said arm means being pivotally connected to said transfer end portion of said second scraper jib about an axis substantially coincidental with said axes of said lower sprocket member.

8. The device of claim 4 wherein said frame includes slideway guide means for slidably guiding said first end portion of said scraper jib means, and winch means connected with said frame and said second scraper jib for raising and lowering said articulated boom.

9. The device of claim 1 wherein said pair of sprocket members on said transfer end portion of said scraper jib means define upper and lower sprocket members and further including at least one sprocket member on said end portion of said conveying means, said lower sprocket member and said one sprocket member on said end portion of said conveying means having spaced-apart axes lying substantially in a substantially common horizontal plane when said scraper jib means is substantially in said substantially horizontal position.

10. The device of claim 1 wherein said conveying means comprises an upwardly inclined steep conveyor having a lower end portion and an upper end portion, said end portion of said conveying means to which said transfer end portion is pivotally connected being defined by said lower end portion.

11. The device of claim 10, wherein said pair of sprocket members on said transfer end portion of said scraper jib means define upper and lower sprocket members each having an axis, said pivot connection between said transfer end portion and said conveying means being substantially coincidental with said axis of said upper sprocket member.

12. The device of claim 10 wherein said pair of sprocket members on said transfer end portion define upper and lower sprocket members, said lower end portion of said steep conveyor having at least one sprocket member thereon, said lower sprocket member and said one sprocket member having spaced-apart axes lying substantially in a common horizontal plane when said scraper jib means is substantially in said substantially horizontal position.

13. The device of claim 12 wherein said upper sprocket member is positioned obliquely above said lower sprocket member in a direction spaced toward said steep conveyor.

14. The device of claim 10 wherein said steep conveyor is pivoted on a horizontal axis located substantially above said lower end portion thereof.

* * * * *